United States Patent

[11] 3,616,136

[72] Inventor Frank Endrenyi, Jr.
 Spartanburg, S.C.
[21] Appl. No. 20,035
[22] Filed Mar. 16, 1970
[45] Patented Oct. 26, 1971
[73] Assignee Deering Milliken Research Corporation
 Spartanburg, S.C.

[54] FLOCKED FABRICS
 5 Claims, No Drawings
[52] U.S. Cl..................................................... 161/64,
 161/67, 260/80.73, 260/898
[51] Int. Cl.............................................B32b 27/04,
 B32b 27/14, C08f 29/56
[50] Field of Search........................................... 260/898;
 161/64, 67

[56] References Cited
UNITED STATES PATENTS

| | | | |
|---|---|---|---|
| 3,503,918 | 3/1970 | Sota et al...................... | 260/80.73 |
| 3,506,479 | 4/1970 | Breens et al................. | 161/67 |
| 3,529,986 | 9/1970 | Kappas et al................ | 161/64 |

Primary Examiner—William J. Van Balen
Attorneys—Norman C. Armitage and H. William Petry ABSTRACT: The disclosure described novel adhesive compositions having improved cold flex characteristics and solvent resistance. The adhesive composition comprises a combination of a particular type of water-insoluble, self-cross-linking acrylic polymer and an acid polymer. These adhesives are useful in the usual applications and, in particular, in preparing laminated fabrics and flocked pile fabric.

FLOCKED FABRICS

BACKGROUND OF THE INVENTION

This invention relates to a novel adhesive composition having improved cold flex characteristics and solvent resistance, and more particularly to an adhesive composition comprising a combination of a particular type of water-insoluble, self-crosslinking acrylic polymer and an acid polymer. These adhesives are particularly useful for preparing flocked pile fabrics.

In the production of flocked fabrics by the deposition of fibrous materials such as rayon or nylon fibers upon adhesive coated substrates, it has been found to be difficult to obtain flocked fabrics which retain their flexibility upon exposure to low temperature. It has been particularly difficult to obtain flocked fabrics having the desirable cold flex characteristics and also solvent resistance so that the flocked fabrics can be dry cleaned as well as machine washed.

There are a number of adhesives commercially available which possess adequate cold flex characteristics and machine washability. However, in addition to these desirable properties, it is also important for adhesive compositions to deposit films which provide satisfactory abrasion resistance and resistance to organic solvents used in dry cleaning. For example, there are commercially available adhesives, particularly acrylic adhesives, which exhibit good cold flex characteristics, and these are characterized as those which deposit air-dried films having a torsional modulus of 300 kg./cm.$^2$ at temperatures such as from $-40°$ C. to $-55°$ C. hereinafter referred to as "$T_{300}$". This measurement relates to the stiffness or softness of a film. Another method of indicating the softness of film is by "Glass Transition Temperature" (G.T.T.). The G.T.T. is defined as that temperature at which a sheet of polymer is transformed from a glasslike solid state to a softened state. Above the glass transition temperature, the volume of the polymer sheet increases more rapidly with an increase in temperature. The point at which this volume increase begins may be readily determined in a plot of volume versus temperature. These glass transition temperatures may be determined by standard A.S.T.M. heat deflection temperature measurements such as, for example, A.S.T.M. D648-45T, issued 1941, revised 1944, 1945. Films prepared from such adhesive compositions, however, are not durable to dry cleaning solvents.

Attempts to improve the durability of such adhesive compositions by introducing cross-linking cites into the polymers or by the addition of the cross-linking catalysts result in a more durable film but with a corresponding reduction in the cold flex properties. Likewise, attempts to introduce plasticizing compounds into the harder durable polymers to improve the cold flex properties have been unsuccessful since the plasticizers are extracted from the films by the dry cleaning solvents. Thus, there continues to be a need for adhesive compositions exhibiting good cold flex and abrasion resistance characteristics, machine washability and dry cleanability.

SUMMARY OF THE INVENTION

Novel adhesive compositions are provided by this invention and comprise a mixture of a water-insoluble, self-cross-linking acrylic polymer, an air-dried film of which has a torsional modulus of 300 kg./cm.$^2$ at a temperature of less than about $-40°$ C. and a hydrophilic acid polymer comprising a major amount of an acid ester and minor amounts of an acrylic acid. Films prepared from such adhesive compositions exhibit improved cold flex characteristics, solvent resistance, abrasion resistance and machine washability. These adhesive compositions are useful wherever adhesives having these properties are desired such as, for example, in the preparation of flocked pile fabrics.

DESCRIPTION OF THE PREFERRED EMBODIMENTS

The adhesive composition of this invention is prepared from a mixture comprising from about 80 to 99 parts of a water-insoluble, self-cross-linking acrylic polymer having a $T_{300}$ or glass transition temperature of less than about $-40°$ C. and from about 1 to 20 parts of a hydrophilic acid polymer comprising a major amount of an acid ester and minor amounts of an acrylic acid. These adhesive compositions are useful for preparing flocked pile fabric, said pile fabrics comprising a substrate, a layer of the above-described adhesive composition on at least one side of said substrate, and a plurality of fibers, each having one end portion embedded in the adhesive layer.

Any of the water-insoluble, self-cross-linking acrylic polymers having a $T_{300}$ or glass transition temperature of less than about $-40°$ C. can be utilized in the preparation of the adhesives. Acrylic polymers of this nature are commercially available with $T_{300}$ or G.T.T. of from $-40°$ C. to $-60°$ C.

The preferred self-cross-linking acrylic polymers are those comprising a mixture of acrylic esters, acrylonitrile and methylol acrylamide. The acrylic esters are those obtained from acrylic acid or methacrylic acid with cyclohexanol or alcohols having from 2 to 18 carbon atoms. Examples of such esters include ethyl acrylate, isopropyl acrylate, butyl acrylate, methyl methacrylate, 2-ethylehexyl acrylate, etc. Acrylic monomers having dual functionality such as the methylol acrylamides are particularly useful as one component in the mixture. Examples of these acrylamides include: N-methylol acrylamides; N-methylol methacrylamide; N-methyl-N-methylol acrylamide; etc. The presence of the methylol acrylamide in the water-insoluble acrylic polymer provides the desirable self-cross-linking properties to the polymer thus enabling the application, deposition and curing of the polymer on the substrate without the necessity for including cross-linking or curing agents which might deleteriously affect the desirable properties of the adhesive. Therefore, the acrylic polymer is designed to be self-cross-linking by incorporating therein from about 0.5 to 5 percent by weight of a methylol acrylamide, based on the weight of the other components of the polymer. Generally, from about 2 to 3 percent of the methylol acrylamide is utilized.

The acrylonitrile is included in the acrylic polymer mixture to improve the durability of the polymer to dry cleaning solvents. The acrylic polymer portion of the adhesive composition of this invention, therefore, generally will comprise from about 85 to 95 parts of an acrylic ester, from 2 to 15 parts of acrylonitrile and from about 0.5 to 5 parts, based on the combined weight of the acrylic ester and acrylonitrile, of a methylol acrylamide.

Examples of the water-insoluble, self-cross-linking acrylic polymers which are preferred for use in this invention include polymers obtained from mixtures comprising: 90 parts of ethyl acrylate, 10 parts of acrylonitrile and 3 parts based on the combined weight of the ester and acrylonitrile, of N-methylol acrylamide; and 90 parts of butyl acrylate, 10 parts of acrylonitrile and 2 parts based on the combined weight of the acrylate and acrylonitrile, of N-methylol acrylamide. These acrylic polymers generally are prepared utilizing emulsion polymerization techniques. Emulsions of this type are commercially available from the Rohm and Haas Company under such trade designations as "Rhoplex K-14" which has a $T_{300}$ of $-47°$ C., and from National Starch and Chemical Corporation under such trade designations as "Nacrylic 25-4445" which has a glass transition temperature of $-51°$ C.

In addition to the acrylic polymer, the adhesive composition of this invention also contains a hydrophilic acid polymer comprising a major amount of an acid ester and minor amounts of an acrylic acid. The incorporation of these acid polymers into the adhesive compositions of the invention produces adhesive compositions having improved abrasion resistance and renders the adhesives more durable to organic solvents. Generally, from about 1 to 20 parts of the hydrophilic acid polymer is incorporated into the mixture containing from about 80 to 99 parts of the self-cross-linking acrylic polymer.

The ester which is present in the acid polymer includes esters of low molecular weight polymerizable organic acids, i.e., those having reactive unsaturated groups therein, with cyclohexanol or alcohols having 2 to 18 carbon atoms. Examples of the polymerizable acid which may be present in the acid mixture in either the acid or ester form, include acrylic acid, methacrylic acid, itaconic acid, crotonic acid, maleic acid, fumaric acid, cinnamic acid, etc. Mixtures of esters and acids are contemplated as useful. In a preferred embodiment, the hydrophilic acid polymer comprises from about 60 to 95 parts of an acrylic ester and from about 5 to 30 parts of an acrylic acid.

In some instances, it is desirable to incorporate a small amount of a methylol acrylamide into the acid polymer to provide self-cross-linking properties to the polymer. In these instances, from about 0.5 to 5 percent of the methylol acrylamide, based on the combined weight of the other components of the acid polymer is utilized. Any of the methylol acrylamides described previously as being components in the acrylic polymer may be utilized in this acid polymer. Examples of some of the acid polymers that may be used in the preparation of the adhesive compositions of the present invention are polymerization products of mixtures of: ethyl acrylate and acrylic acid; ethyl acrylate, acrylic acid and acrylamide; butyl acrylate and acrylic acid; ethyl acrylate and methacrylic acid; ethyl acrylate, acrylic acid and N-methylol acrylamide; ethyl acrylate, acrylic acid and hydroxy propyl methacrylate; ethyl acrylate, acrylic acid, ethoxyethyl acrylate and N-methylol acrylamide; ethyl acrylate, methacrylic acid, acrylic acid, and N-methylol acrylamide; ethyl acrylate, methacrylic acid, dibutyl maleate and N-methylol acrylamide.

These acid polymers generally are prepared utilizing emulsion polymerization techniques, although it is possible to prepare solutions of these polymers in organic solvents. Examples of such solvents include benzene, toluene, chloroform, trichloroethylene, methyl isobutyl ketone, etc.

As mentioned previously, the adhesive composition of the invention comprises from about 80 to 99 parts of the water-insoluble, self-cross-linking acrylic polymer and from about 1 to 20 parts of the hydrophilic acid polymer. In addition to the two above-described polymers, the adhesive composition also may contain a small amount, for example, up to about 2 to 3 percent or more of a cross-linking catalyst. The presence of this small amount of catalyst expedites the curing of the adhesive without a serious negative effect of the desirable properties on the adhesive. Examples of such catalysts include ammonium chloride, citric acid, oxalic acid, zinc chloride, ammonium citrate, etc. The adhesive compositions also may contain varying amounts of thickeners to increase the viscosity of the adhesive as the application technique may require. Examples of such thickeners include the well-known thickeners such as gum, methylcelluloses such as the "Methocels" available from the Dow Chemical Co., and neutralized polyacrylates. The viscosity of the adhesive compositions is varied depending upon the particular structure and porosity of the structure to which the adhesive is applied. For most textile woven fabrics, adhesive compositions having viscosities of between about 50,000 to 500,000 centipoises have been found quite suitable for coating the fabrics. Compositions having viscosities of about 75,000 to 100,000 centipoises are preferred since they can be handled most readily.

The following compositions illustrate the adhesive compositions of this invention. Unless otherwise indicated, all parts and percentages are by weight.

| Composition A | Parts |
|---|---|
| "Rhoplex K-14" (A water-soluble, self-cross-linking acrylic polymer emulsion of about 90 parts of butyl acrylate, 10 parts of acrylonitrile and from about 2 to 3 parts based on the weight of the butyl acrylate and the acrylonitrile of N-methylol acrylamide—commercially available from Rohm and Haas Co.—46% solids) | 100.0 |
| Copolymer comprising 70 parts of methacrylic acid and 30 parts ethyl acrylate (20% solids) | 15.0 |
| "Wica Thica 6038" (A neutralized polyacrylate thickener available from Wica Chemical Company) | 5.0 |

| Composition B | |
|---|---|
| "Nacrylic 25-4445" (An acrylate polymer emulsion of about 92 parts butylacrylate, 8 parts of acrylonitrile and about 2 parts, based on the combined weight of the acrylate and acrylonitrile of N-methylol acrylamide—commercially available from National Starch and Chemical Corporation—45% solids) | 90.0 |
| Copolymer emulsion of 70 parts methacrylic acid and 30 parts of ethyl acrylate—20% solids | 4.0 |
| "Colloids 585" (A defoamer available from Colloids of Carolina, High Point, North Carolina) | 0.1 |
| Ammonium chloride catalyst | 0.25 |
| "Wica Thica 6038" | 5.0 |

| Composition C | |
|---|---|
| "Nacrylic 25-4445" | 87.0 |
| "Colloids 585" | 0.1 |
| Ammonium chloride | 0.5 |
| Emulsion polymer of 10 parts acrylic acid, 10 parts ethoxyethyl acrylate, 80 parts ethyl acrylate and 2 parts, based on the combined weight of the acrylic acid and the acrylates, of N-methylol acrylamide—30% solids | 1.0 |
| "Acrysol ASE-60" (A cross-linked acrylic copolymer emulsion available from Rohm and Haas Co.) | 5.0 |
| Ammonia | 1.0 |

| Composition D | |
|---|---|
| "Nacrylic 25-4445" | 100.0 |
| Copolymer emulsion of a mixture of about 22.5 parts acrylic acid, 108 parts ethyl acrylate, 12 parts dibutyl maleate, 7.5 parts methacrylic acid and 3.6 parts of N-methylol acrylamide—20% solids | 15.0 |
| "Colloids 585" | 0.1 |
| Ammonium chloride | 0.5 |
| "Wica Thica 6038" | 5.0 |

| Composition E | |
|---|---|
| "Nacrylic 25-4445" | 100.0 |
| "Colloids 585" | 0.2 |
| Copolymer emulsion of 78 parts ethyl acrylate, 5 parts methacrylic acid, 15 parts acrylic acid and 2 parts, based on the combined weight of the acid and acrylate of N-methylol acrylamide—20% solids | 15.0 |
| Ammonium chloride | 0.25 |
| "Wica Thica 6038" | 8.0 |

Films of the above-described adhesive compositions exhibit improved tensile strength, elongation, cold flex characteristics and resistance to organic solvents.

The effect of organic solvents on films of the adhesive compositions was determined by immersing thin films cut 1.5-inches square in perchloroethylene for 2 hours and thereafter measuring the change in area to compute percent area increase. A film from composition E exhibited a percent area increase of only 187 percent and demonstrated excellent cold flex at 0° F. When a film similar to that obtained form composition E is prepared except that the acrylic acid copolymer is omitted from the composition, the film exhibits a percent area increase of 314 percent. The above test demonstrates the improved solvent resistance of the adhesive compositions of this invention comprising a combination of the acrylic polymer and an acid polymer.

The improved tensile strength exhibited by the films prepared from the adhesive compositions of this invention as compared to films obtained from the acrylic polymer itself, is demonstrated by preparing thin films 4.5 inches by 1.5 inches which have been cured for 3 minutes at 300° F. The tensile strength is determined in accordance with the standard Grab Tensile Test (A.S.T.M. d1682-64) utilizing a crosshead speed of 12 inches/minute and a chart speed of 5 inches/minute. The breaking load and percent elongation at break are recorded.

Films prepared from composition E are found to have a tensile strength of 2.03 pounds and a percent elongation of 730 percent whereas films from a similar composition except that the acrylic acid copolymer is omitted were found to have a tensile strength of only 0.67 pounds and an elongation of 695 percent.

The adhesive compositions of this invention have been found to be particularly useful in textile applications such as in the preparation of laminated fabrics, flocked pile fabrics, etc. Such fabrics have been found to exhibit improved flexibility and drape at low temperatures. The flocked pile fabrics may be made into such products as wearing apparel, blankets, towels, upholstery material and rugs. These products exhibit a resistance to abrasion and organic solvents which increases the commercial acceptance of such products.

The utility of the adhesives in the preparation of flocked pile fabrics will be described to illustrate one of the useful applications of the adhesive compositions. Processes for preparing flocked pile fabrics are well-known in the art and need not be described in detail in this application. Briefly, a substrate or backing material is provided, and this material which may be any material conventionally employed in flocking operations such as for instance, jute, cotton, paper, rubber sheeting, plastics, woven fabrics, knitted fabrics and nonwoven fabrics including felts of natural and synthetic fibers and filaments, is coated on at least one side with the adhesive. The adhesive may be applied in the form of a continuous film or printed on selected areas of the substrate. A plurality of flock fibers are then distributed onto the adhesive layer and oriented in such position that one end portion of each of said fibers is embedded in the adhesive layer. The nature of the orientation of the fibers is dependent upon the type of flocked fiber distribution means employed and these include spraying or mechanical or electrostatic methods. The mechanical and electrostatic methods of fiber distribution and orientation provide a more uniform orientation of the flocked fibers in an upstanding position than obtained by the spraying method. The most uniform orientation of the flocked fibers perhaps is acquired through a combination of the mechanical and electrostatic methods wherein a relatively high percentage of the fibers assume a position substantially normal to the plane of the substrate with their end portion embedded in the adhesive layer.

Any type of fiber which is normally employed in flocking operations, either natural or synthetic, may be utilized, but best results are acquired through the use of fibers in a range of from dust to 60 denier with an overall length of up to about 100 mils or more depending upon the end use of the product. For example, longer fibers may be desirable when the end product is to be a towel or a carpet whereas shorter fibers may be preferred where the fabric is to be utilized in the preparation of wearing apparel.

The amount of adhesive applied to the substrate likewise is not critical and is determined by the anticipated end use and the properties desired therein. An adhesive thickness of up to about 10 to 15 mils dry has been found acceptable. The adhesive may be applied to the substrate as an aqueous emulsion or in an organic solvent either in one application or in two separate applications. In the two application procedure, the first coating is applied as a more viscous mixture in order to provide a coating with a minimum of strike-through. This is followed by a second coating to which the fibers adhere and which may be of a lower viscosity since strike-through should not present a problem.

Once the fibers have been embedded and oriented into the adhesive coating, the adhesive is cured or set to fix the fibers therein. Curing is accomplished by heating the fiber-impregnated, adhesive-coated substrate. The temperature of the curing will depend upon the particular adhesive utilized and, also, on the desired rate of curing. For example, when the flocked fabric is prepared in a continuous apparatus, shorter curing times are desirable and higher temperatures are utilized in heated ovens.

The following example will illustrate a procedure for preparing flocked pile fabric of the type contemplated by this invention. In this example, the substrate is a high wet modulus rayon sateen fabric, the adhesive composition is composition E described previously and the flocked fibers are rayon fibers of 5.5 denier comprising a mixture of fibers of from 60 to 80 mils in length. The sateen is first coated with a base coat of composition E with the viscosity adjusted to about 95,000 c.p.s. (as determined on a Brookfield Viscometer using a No 6 spindle at a speed of 4 r.p.m.) to a pickup of approximately 1.5'-ounces per yard of sateen, dried and, thereafter top coated with the same composition to a pickup of 3.5-ounces per yard. The total dry thickness of adhesive is approximately 9 mils. The flocked fibers are then deposited using a combination of a beater bar and electrostatic techniques. The flocked fabrics prepared in this manner then are dried by heating to a temperature of 280° F. for 2 minutes and thereafter cured in a forced air oven at a temperature of 300° F. for 8 minutes. The fabric is then dyed choosing a direct dye, and the fabric is in contact with the dye solution maintained at a temperature of about 200° F. for 1 hour. After rinsing and drying, the fabric is ready for conversion to the desired end product.

Fabrics prepared in accordance with the above procedure were evaluated to determine their abrasion resistance, cold flex properties, washability and dry cleanability. The cold flex characteristics of the flocked samples are demonstrated by placing the samples in a freezer compartment wherein the temperature is maintained at 0° F. The samples are left in the freezer for 15 minutes to insure that the freezing is complete. The sample then is handled while still in the freezer to determine its hand, draped over some solid object to determine its drapeability, flexed, rubbed, shaken for rattle and compared with other samples. Fabrics prepared in accordance with the above procedure utilizing composition E as an adhesive exhibited good cold flex properties.

The abrasion resistance of the above prepared flocked fabric is determined utilizing a Taber Abrader fitted with CS 10–wheels, 500 gm. weights and run for 1,500 cycles. Samples tested in this manner showed no significant loss of flock and no substrate could be viewed through the flocked fibers indicating excellent abrasion resistance of the flocked fabric.

The dry cleanability of the flocked fabric is determined by subjecting the fabric to 5 washing cycles in perchloroethylene each lasting approximately 30 minutes. This test used is AATCC Test Method 1963 T, "Durability of Applied Designs and Finishes." The fabrics which have been subjected to five dry cleaning cycles showed very little loss of flock and retained their excellent cold temperature flex properties. The abrasion resistance of the dry cleaned fabric also was tested and found to be good.

The machine washability of these flocked fabrics is determined by subjecting the fabrics to 5 cycles in an automatic washing machine (with tumble drying between cycles) at 120° F. utilizing a commercial detergent. The durability of the flocked fabrics was found to be excellent.

Similar results are obtained when other substrates and other flocked fibers are utilized in the preparation of flocked pile fabrics. For example, nylon flocked fibers having about the same denier and length as the rayon fibers described above provide an excellent flocked fabric.

That which is claimed is:

1. A flocked pile fabric having improved cold flex characteristics and solvent resistance comprising
   a. a substrate,
   b. an adhesive layer on at least one side of said substrate, said adhesive layer comprising a composition comprising from about 80 to 99 parts of a water-insoluble, self-crosslinking acrylic polymer, an air-dried film of which has a torsional modulus of 300 kg./cm.$^2$ at a temperature of less than about −40° C. and from about 1 to 20 parts of an acid polymer comprising a major amount of an acid ester and minor amounts of an acrylic acid, and
   c. a plurality of fibers, each having one end portion embedded in said adhesive layer.

2. The flocked pile fabric of claim 1 wherein the acrylic polymer of the adhesive composition comprises from about 85 to 95 parts of an acrylic ester, from 2 to 15 parts of acrylonitrile and from 0.5 to 5 parts of a methylol acrylamide.

3. The flocked pile fabric of claim 2 wherein the acrylamide in N-methylol acrylamide and the acrylic ester is butyl acrylate.

4. The flocked pile fabric of claim 1 wherein the acid polymer comprises from about 60 to 85 parts of an acrylic ester, from about 5 to 30 parts of an acrylic acid and from about 0.5 to 5 parts of a methylol acrylamide.

5. The flocked pile fabric of claim 4 wherein the acrylic acid is a mixture of acrylic acid and methacrylic acid.